(12) United States Patent
Butzen

(10) Patent No.: US 6,414,481 B1
(45) Date of Patent: Jul. 2, 2002

(54) PORTABLE TESTER AND CALIBRATION APPARATUS FOR A SPEED OR POSITION SENSOR

(75) Inventor: Michael J. Butzen, Sheboygan, WI (US)

(73) Assignee: Brunswick Corporation, Lake Forest, IL (US)

( * ) Notice: Subject to any disclaimer, the term of this patent is extended or adjusted under 35 U.S.C. 154(b) by 47 days.

(21) Appl. No.: 09/671,032

(22) Filed: Sep. 27, 2000

(51) Int. Cl.[7] .......................... G01B 35/00; G01P 21/00
(52) U.S. Cl. ......................................... 324/202; 73/1.37
(58) Field of Search ........................... 324/202, 207.11, 324/207.25, 160, 166; 73/1.01, 1.37, 866.5

(56) References Cited

U.S. PATENT DOCUMENTS

| | | | |
|---|---|---|---|
| 4,074,196 A | 2/1978 | Webster | 324/166 |
| 4,687,952 A | 8/1987 | Capizzi, Jr. | 307/261 |
| 4,949,444 A | 8/1990 | Kojima et al. | 29/27 |
| 5,304,926 A | 4/1994 | Wu | 324/207 |
| 5,497,084 A | 3/1996 | Bicking | 324/207 |
| 5,850,046 A | * 12/1998 | Slates et al. | 73/866.5 |
| 5,922,953 A | 7/1999 | Payne et al. | 73/494 |

* cited by examiner

*Primary Examiner*—Walter E. Snow
(74) *Attorney, Agent, or Firm*—William D. Lanyi

(57) ABSTRACT

An apparatus is provided for testing and calibrating a sensor of a complex machine tool while the sensor is completely separated from the machine tool. The sensor, which is typically a gear tooth sensor, can typically comprise a sensing head and a printed circuit board which contains an electronic circuit designed to manipulate signals received from the sensing head. A movable target, such as a gear tooth wheel, is driven by an air motor, and the sensing head is attached to a support structure with the operative surface of the sensing head being located a preselected distance from the discontinuities of the target simulator. A signal receiver, such as oscilloscope is easily connected in signal communication with the printed circuit board so that an operator can adjust the amplitude and offset of the signals as the target simulator is operated.

18 Claims, 4 Drawing Sheets

PORTABLE TESTER AND CALIBRATION APPARATUS FOR A SPEED OR POSITION SENSOR

BACKGROUND OF THE INVENTION

1. Field of the Invention

The present invention is generally related to a testing and calibrating apparatus and, more particularly, to a portable apparatus that provides a target simulator to test and calibrate the operating condition of a sensor, such as a gear tooth sensor.

2. Description of the Prior Art

Many different types of machines use position sensors to determine the relative position of one component relative to another component. These position sensors can be used to determine the precise relative position of two components or, when used in conjunction with a timing device, can be used to determine the velocity of one component relative to another. When used in association with a rotatable component, such as a shaft of a machine tool, the sensor can be used to control the operating speed of the shaft.

Many different types of machine tools are known to those skilled in the art. U.S. Pat. No. 4,949,444, which issued to Kojima et al on Aug. 21, 1990, describes a machine tool machining method. A complex machine tool is provided with a single frame having a chip collector space at a center portion thereof. First and second spindle stocks are provided on the frame and are relatively free to move and drive in a Z axis direction while holding the chip collecting space therebetween. Workpiece spindles on the spindle stocks are free to rotate and drive while facing each other. Tool rests are also provided. The tool rests have turrets and can assume various kinds of movement. Complicated and varied types of machining can be performed by combining the rotation control of the workpiece spindles and the spindle stocks.

Gear tooth sensors are used in conjunction with machine tools and many other types of devices. Typically, the gear tooth sensor is associated with some type of rotatable component, such as a gear wheel, that has a number of irregularities that are sensed by the sensor. By knowing the number of irregularities in the circumferential surface of the rotatable member, the position of the shaft can be determined, along with its philosophy. U.S. Pat. No. 5,922,953, which issued to Payne et al on Jul. 13, 1999, describes a sensor apparatus with self-adjusting mechanism for minimizing airgap. The apparatus is useful for detecting the speed and/or position of an object moving along a defined path and more particularly to such an apparatus configured to minimize the spacing between a sensing face of the apparatus and a target surface on the object. Embodiments of the invention are particularly suited for sensing the speed of a rotating member, such as gear, by utilizing a sensor, such as a Hall-effect sensor, to detect the movement of each gear tooth moving past the sensor. The apparatus is configured to mount the sensor for adjustable positioning along a sensor path between an initial position and a final operational position. Movement of the sensor along the sensor path is restricted, for example by frictional engagement, but can be overcome by contact with the target surface so as to move the sensor to its final position with the spacing between the sensing face and the target face minimized.

U.S. Pat. No. 5,497,084, which issued to Bicking on Mar. 5, 1996, discloses a geartooth sensor with means for selecting a threshold magnitude as a function of the average and minimum values of a signal of magnetic field strength. The geartooth sensor is provided with a circuit which determines a threshold magnitude as a function of a minimum value of a first output signal from a magnetically sensitive component and an average output signal from a magnetically sensitive component. Circuitry is provided to determine the average signal. The minimum signal is than subtracted from the average signal and the resulting signal is doubled before being scaled to a predetermined fraction and then compared to the original output signal from the magnetically sensitive component. This circuit therefore determines a threshold signal as a function of both the minimum signal value and the average signal value and, in addition, enables the resulting signal to be scaled to a predetermined percentage of this difference for the purpose of selecting a threshold value that is most particularly suitable for a given application.

U.S. Pat. No. 5,304,926, which issued to Wu on Apr. 19, 1994, discloses a geartooth position sensor with two Hall effect elements. The position sensor has two magnetically sensitive devices associated with a magnet. The sensor is disposable proximate a rotatable member having at least one discontinuity in its surface. The two magnetically sensitive devices, such as Hall effect transducers, each provide output signals that represent the direction and magnitude of the magnitude field in which its respective transducer is disposed. An algebraic sum of the first and second output signals from the magnetically sensitive devices is provided as an indication of the location of the rotatable member that is disposed proximate the sensor.

U.S. Pat. No. 4,687,952, which issued to Capizzi on Aug. 18, 1987, describes a dynamic angular position sensor for a reference geartooth. A magnetic transducer is mounted on a turbine engine and forms a sinusoidal signal as the teeth of a gear attached to the engine shaft pass the head of the magnetic transducer. One tooth of the gear is a short tooth having its tip slightly shaved and acts as a reference point from which angular deviation is measured. The sinusoidal signal is first used to maintain the peak-to-peak amplitude of the sinusoidal signal within a predetermined range. A pulse generator forms a spike pulse each time the short tooth passes the magnetic transducer. A comparator circuit uses the spike pulse to enable a one shot creating a reference pulse of a specified length. A counter circuit, clocked by a zero axis detector, is provided for ensuring that only one reference pulse is generated for each rotation of the gear.

U.S. Pat. No. 4,074,196, which issued to Webster on Feb. 14, 1978, describes a speedometer and odometer apparatus. The apparatus comprises an encoding apparatus for generating pulses as a function of the distance a vehicle is moved, a calibrating apparatus and an indicating circuit means for visually indicating the distance and speed of the movement.

The patents described above are hereby expressly incorporated by reference in the description of the present invention.

The repair and maintenance of complicated machine tools often require the gear tooth sensors to be removed or replaced. When a new or repaired gear tooth sensor is again placed in its operating position relative to the machine tool, it is sometimes later determined that the gear tooth sensor or its related circuitry is faulty. If this problem is first discovered after the sensor is completely installed in the machine, subsequent removal of the defective sensor can be very time consuming and expensive. It would therefore be significantly beneficial if an individual gear tooth sensor could be tested and calibrated in an environment that simulates the actual machine tool, but which is easily portable and which affords the operator an opportunity to dynamically adjust and calibrate the sensor without having to dismantle the machine tool itself.

SUMMARY OF THE INVENTION

The present invention provides an apparatus for testing a sensor, in which the apparatus comprises the target simulator that is representative of a target located within the structure of a machine tool with which the sensor under test will eventually be used. The apparatus also comprises a motor that is attached to the target simulator for the purpose of causing the target simulator to move along a preselected path, such as a circular path. The apparatus comprises a source of electric power that is connectable in electrical communication with the sensor. The source of electric power, in a preferred embodiment of the present invention, is a power supply that provides a 15 volt DC current to the sensor under test. The apparatus also comprises a signal receiver that is connectable in signal communication with the sensor. The signal receiver is configured to annunciate one or more preselected signals transmitted from the sensor under test. In a particularly preferred embodiment of the present invention, the signal receiver can be a conventional oscilloscope of the type that is generally well known to those skilled in the art. The oscilloscope, which is also portable, can be connected to selected locations on a circuit board associated with the sensor. The apparatus of the present invention further comprises a holding fixture that is located at a preselected distance from the target simulator and is shaped to hold the sensor at a fixed distance from the target simulator when the motor causes the target simulator to move along the preselected path.

In a particularly preferred embodiment of the present invention, the motor is an air powered motor. The use of an air powered motor avoids electrical interference that might otherwise be generated by an electric motor. The electrical noise could otherwise interfere with the proper testing and calibration of the sensor under test. In a particularly preferred embodiment of the present invention, the target simulator is a rotatable component which comprises a plurality of surface discontinuities formed in the target simulator along its circumference. The surface discontinuities are movable past the sensor under test when the sensor under test is attached to the holding fixture of the present invention.

The present invention further comprises a speed control device for manually selecting a convenient operating speed of the air powered motor. In a preferred embodiment, the speed control device is a hand operated valve that controls the flow of air from an air pressure source to the air powered motor.

In most applications of the present invention, the sensor actually comprises an individual sensing head and an individual electronic circuit, wherein the electronic circuit is connected in signal communication with the sensing head. The electronic circuit is connectable in signal communication with the signal receiver of the present invention, when the sensor under test is being tested or calibrated.

The holding fixture of the present invention can comprise a first mounting fixture shaped to hold the sensing head and a second mounting fixture shaped to hold the electronic circuit. The signal receiver, which is an oscilloscope in a preferred embodiment of the present invention is connectable in signal communication with the sensor and, more particularly, with the electronic circuit associated with the sensing head of the sensor under test. The signal receiver, or oscilloscope, is typically configured to visually annunciate one or more preselected signals transmitted from the sensor to the signal receiver. In most applications of the present invention, the visually annunciated signals are sinusoidal in nature.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
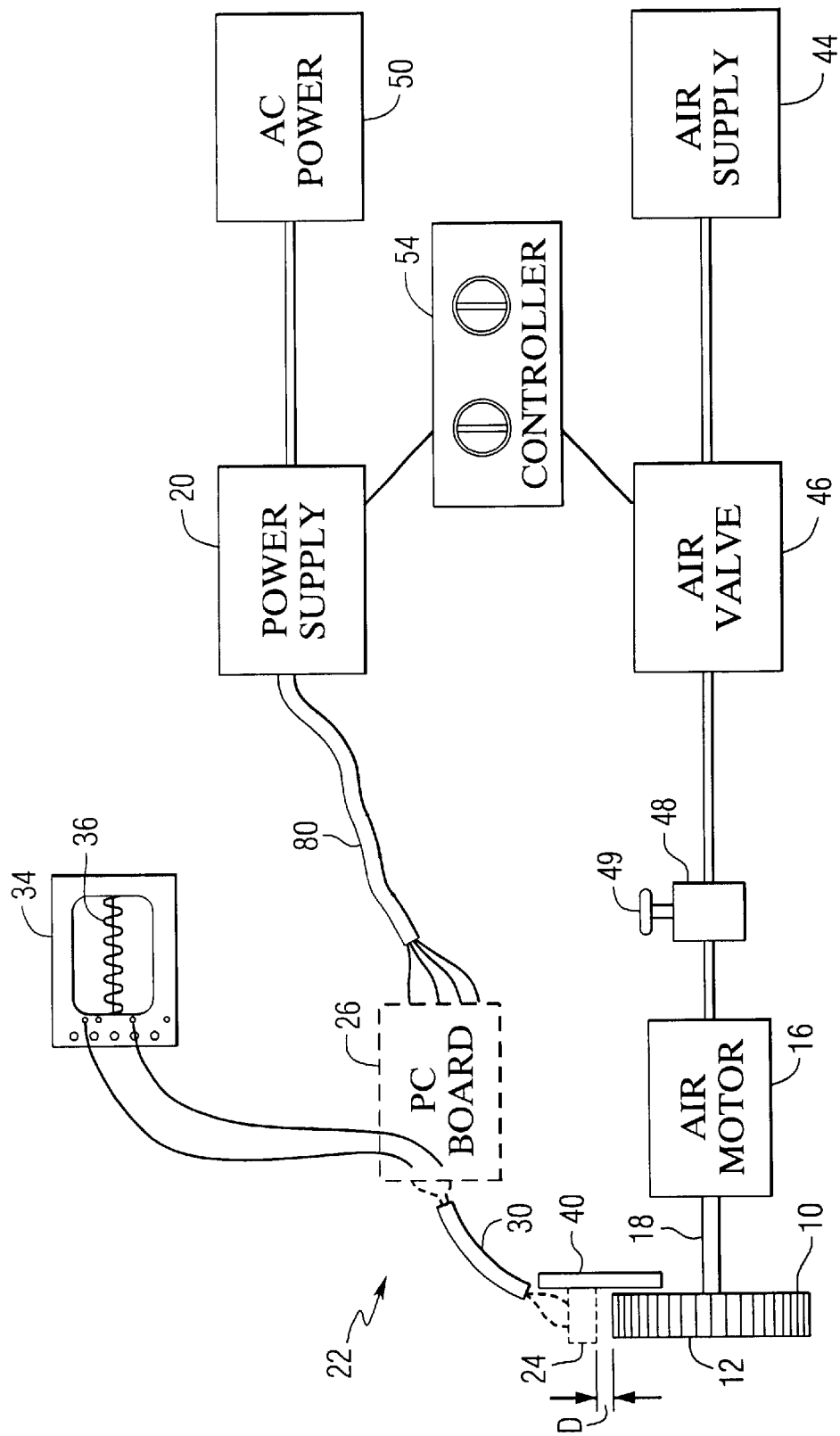
FIG. 1 is a schematic representation of the present invention associated with a sensing head and printed circuit board of a sensor.

Throughout the description of the preferred embodiment of the present invention, like components will be identified by like reference numerals.

In FIG. 1, a preferred embodiment of the present invention is illustrated schematically. The present invention comprises a target simulator 10 which is a rotatable wheel having a plurality of discontinuities 12 which, in a typical application of the present invention, comprises a plurality of gear teeth formed on the wheel. A motor 16 is attached to the target simulator 10, by a shaft 18, to cause the target simulator 10 to move along a preselected path which, in the illustrated case, is a circular path traveled by the gear teeth or discontinuities 12 in the outer circumferential surface of the target simulator 10. A source of electric power 20 is connectable in electrical communication with the sensor 22. It should be noted that the sensor 22, which can typically comprise a sensing head 24 and an electronic circuit 26, is represented in dashed lines in FIG. 1. The sensing head 24 and the electronic circuit, or PC board 26, are connected to each other in electrical and signal communication by one or more electrical conductors 30. The sensor 22 is represented by dashed lines in FIG. 1 because the sensor is not part of the present invention. Instead, the present invention is intended to provide a portable testing and calibrating machine that is designed to test and calibrate the sensor 22. A signal receiver 34 is connectable in signal communication with the sensor 22. The signal receiver 34, which can be a portable oscilloscope, is easily configured to annunciate one or more preselected signals transmitted from the sensor 22 to the signal receiver 34. In FIG. 1, the one or more signals are represented by a sinusoidal wave form 36 displayed visually by the signal receiver 34.

With continued reference to FIG. 1, a holding fixture 40 is located at a preselected distance from the target simulator 10. In the embodiment shown in FIG. 1, the holding fixture comprises two predrilled and pretapped holes in the front face of a portion of the present invention which will be described in greater detail below. The sensing head 24 is attached to the front face of that portion of the present invention to hold it a preselected distance D (e.g. about 0.007 inches) from the movable surface of the target simulator 10. Although not shown in FIG. 1, the printed circuit board 26, or electronic circuit, of the sensor 22 is also provided with a holding fixture. The holding fixture associated with both the sensing head 24 and the electronic circuit 26 will be described in greater detail below.

The motor 16 is an air motor in order to avoid unnecessary electrical signals and noise in the proximity of the sensor 22. The air motor 16 is driven by pressurized air from an air supply 44 which can be a normal air supply that is commonly used in industrial environments. An air valve 46 controls the passage of air from the air supply 44 to the air motor 16. A hand operated speed control mechanism 48 can also be provided to allow an operator of the present invention to adjust the rate of flow of air from the air supply 44, through the air valve 46, and to the air motor 16. By adjusting a hand operated knob 49, an operator can advantageously select the rotational speed of the target simulator 10 in order to make the signals visually observed on the signal receiver 34 more clearly visible as the sensor 22 is tested and calibrated. The power supply 20, which provides a 15 VDC current to the sensor 22, is connected to a source of alternating current power 50 which can be typical house current that is readily available in industrial environments. A controller 54 provides the operator of the present invention with an ability to control the operation of the air valve 46 and, as a result, the air motor 16, and also to control the operation of the power supply 20. This will be described in greater detail below.

Figure 2:
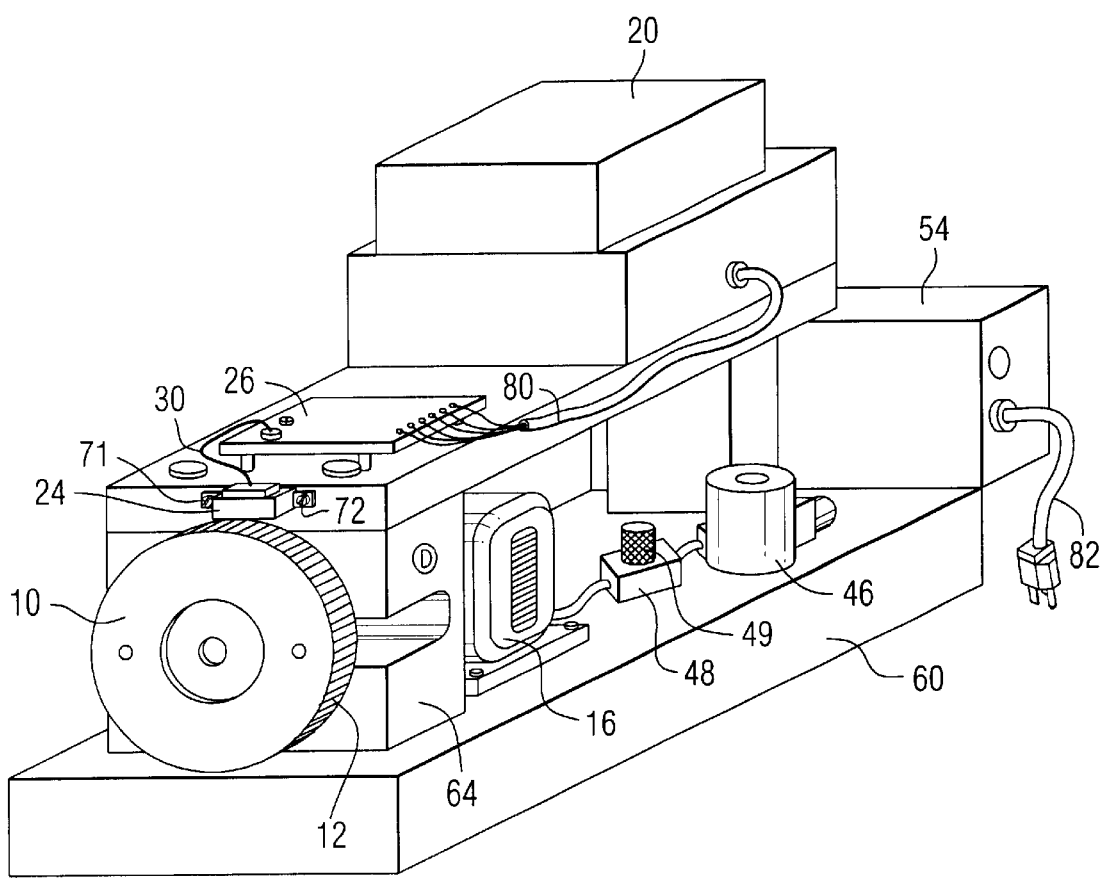
FIG. 2 is an isometric view of the present invention.

FIG. 2 is an isometric view of a portable tester and calibrating machine made in accordance with the present invention. A base structure 60 provides support for most of the components of the present invention. A support structure 64 is provided with an opening through which the shaft 18, as described above in conjunction with FIG. 1, extends from the motor 16 to the rotatable target simulator 10. As described above, the target simulator 10 has a plurality of discontinuities 12 formed in its outer circumferential surface. The support structure 64 is provided with two threaded holes that can be used to mount the sensing head 24 of the sensor 22. Two screws, 71 and 72, can be used to attach the sensing head 24 to the support structure 64. In addition, a printed circuit board 26 of the sensor 22 can be mounted to the upper surface of the support structure 64 to hold it in place. A wire 30 is shown connecting the sensing head 24 to the electronic circuit 26. An operator control box 54, which will be described in greater detail below, allows the operator to provide electrical power to the power supply 20 which, in turn, is connected to the printed circuit board 26 by electrical wires 80. As represented by electrical cord 82, the present invention is connectable to a source of AC electrical power 50 as described above in conjunction with FIG. 1.

The present invention, as represented in the isometric illustration of FIG. 2, is easily portable from one location to another to allow the gear tooth sensors and position sensors of various large and complicated machines to be tested at the site of the machine. It can also be transported to a location where new sensors are received from the manufacturers so that the new sensors can be unpackaged and tested prior to installation in the machine tools. As will be described in greater detail below, the sensor 22 can also be calibrated by using the present invention, as shown in FIG. 2, in combination with a signal receiver 34 as described above in conjunction with FIG. 1. The signal receiver 34 can be an oscilloscope that is easily connectable to the printed circuit board 26 of the sensor 22.

Figure 3:
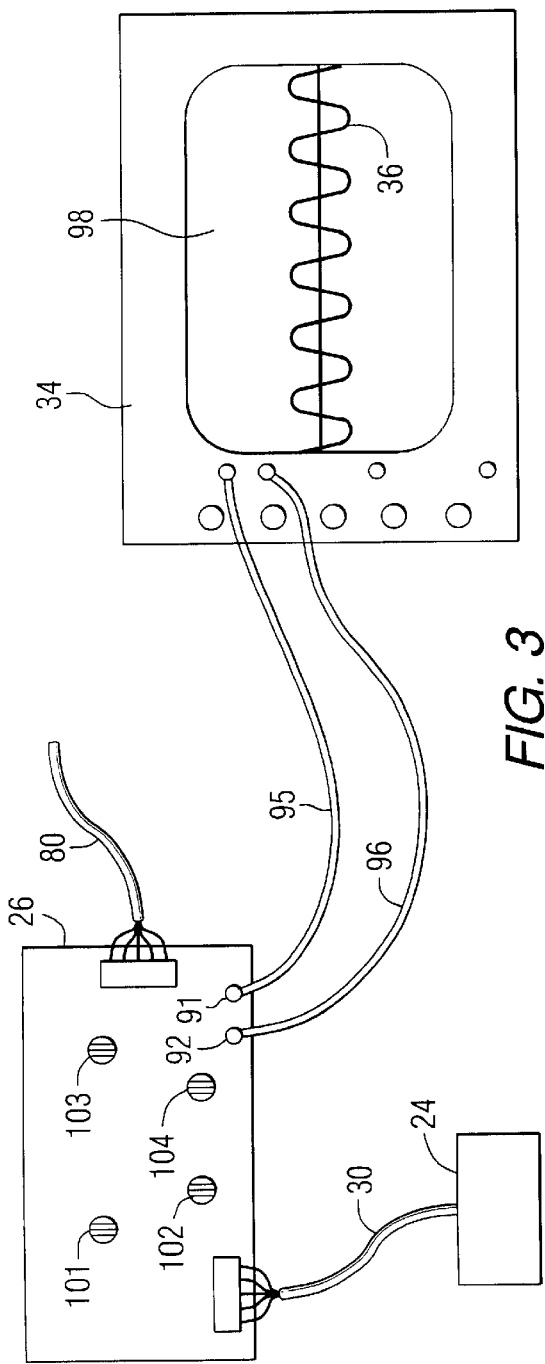
FIG. 3 is a detailed schematic representation of a printed circuit board and sensing head of a sensor connected to a signal receiver such as an oscilloscope.

FIG. 3 shows the way in which the signal receiver 34, which is illustrated as an oscilloscope, can be connected to output pins 91 and 92, on the printed circuit board 26. Two wires, 95 and 96, are connected to input ports on the oscilloscope. Various types of oscilloscopes have capabilities to manually select either or both of the signals to be displayed on the monitor 98 of the oscilloscope. With continued reference to FIG. 3, the sensing head 24 is connected by wires 30 to the printed circuit board 26 or electronic circuit, associated with the particular style of sensing head 24 being tested. The wires 30 typically have a removable socket that can be attached to pins on the printed circuit board 26. Power is provided to the printed circuit board by cable 80 which is connected to the power supply 20 that is not shown in FIG. 3, but which was described above in conjunction with FIGS. 1 and 2. On certain types of circuit boards, adjustment potentiometers are provided to selectively change the gain and offset for the two signals available at pins 91 and 92. As an example, the amplitude of the signal on the wire 96 can be adjusted by manipulating potentiometer 101. The offset of the signal 36 on wire 96 can be adjusted by manipulating potentiometer 102. Similarly, potentiometers 103 and 104 can be used to affect the amplitude and offset of the signal available at pin 91 and conducted by wire 95 to the signal receiver 34. By adjusting the potentiometers, 101–104, both of the signals that are available at pins 91 and 92 can be adjusted according to specifications provided with the sensor 22 to achieve maximum performance of the machine tool when the sensor 22 is installed in the machine tool.

Figure 5:
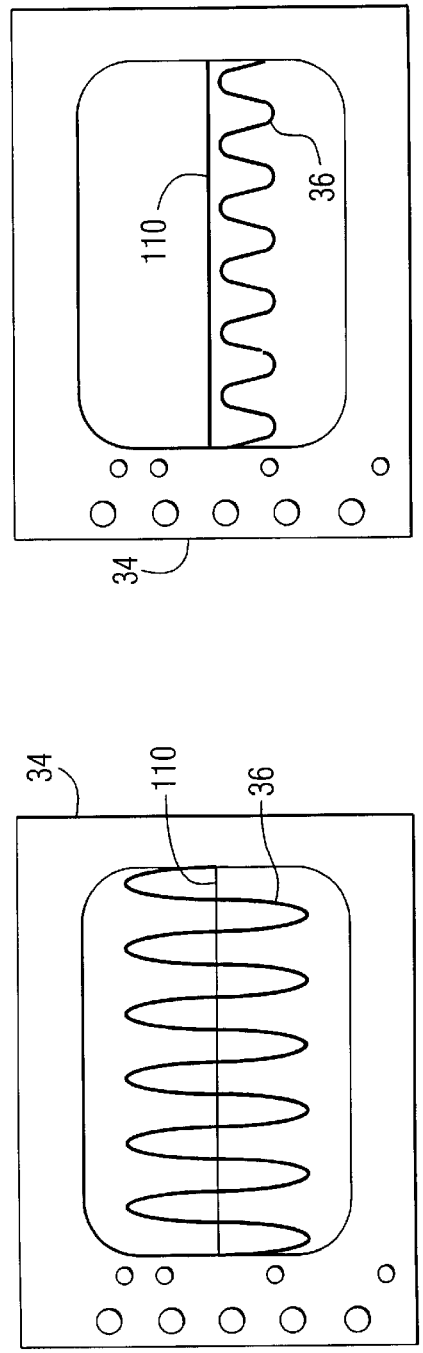
FIGS. 4 and 5 show monitors of oscilloscopes with two variations of signals.
Figure 4:
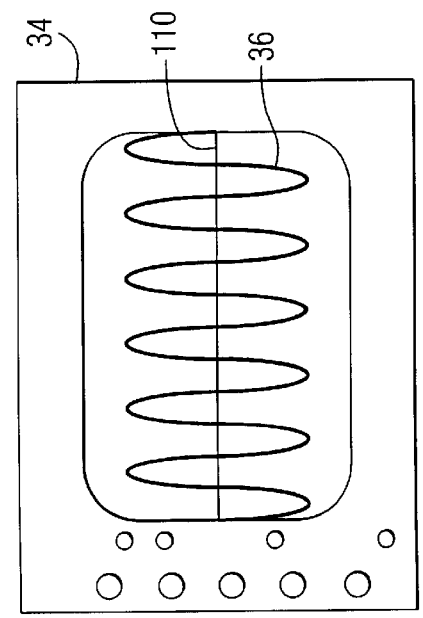

FIGS. 4 and 5 show the signal receiver 34, or oscilloscope, with the signal 36. In FIG. 4, the amplitude of signal 36 has been changed, by adjustment of one or more of the potentiometers, 101–104, described above in conjunction with FIG. 3. In comparison, FIG. 5 shows the signal 36 after the offset has been affected. It can be seen that the average magnitude of signal 36 is decreased, relative to a reference axis 110, compared to the illustration shown in FIG. 4. The changes and calibrations made to the signal 36, as described above in conjunction with FIGS. 3, 4, and 5, can be performed with the sensor 22 mounted to the support structure 64 of the present invention, as illustrated in FIG. 2. The operator can view the monitor 98 of the oscilloscope and adjust the potentiometers, 101–104, until a wave form of signal 36 is adjusted within the prescribed specifications. In order to perform the testing and calibration procedures, there is no need to install the sensor 22 within the actual machine tool itself. Instead, the sensing head 24 and printed circuit board 26 can be attached to the holding fixture, or mounting means of the present invention, as illustrated in FIG. 2 and the target simulator 10 can be rotated by motor 16 so that a continuous signal is generated by the sensing head 24 and printed circuit board 26. As the target simulator 10 continues to rotate and the plurality of discontinuities 12 pass under the sensing head 24, the operator can adjust the potentiometers, 101–104, to achieve the desired wave form of signal 36. When the testing and calibration procedure is complete, the sensing head 24 and printed circuit board 26 can be dismantled from the present invention and permanently installed within the machine tool with confidence that the sensor 22 is operating properly and is properly calibrated.

Figure 6:
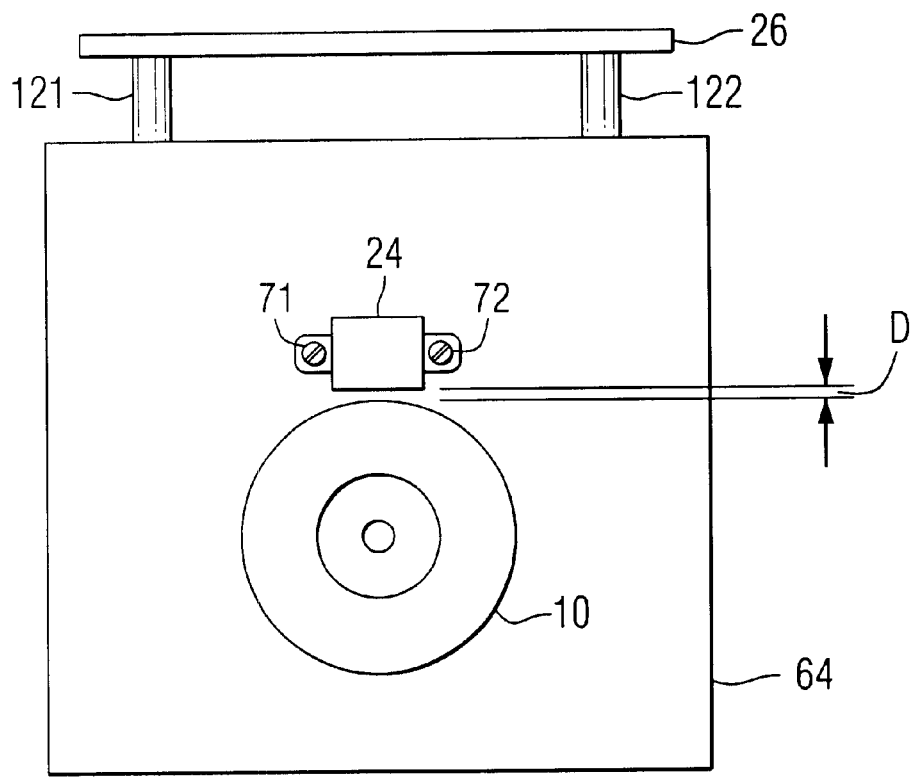
FIG. 6 is a front view of the present invention.

FIG. 6 is a front view of the present invention that is shown in an isometric view in FIG. 2. The support structure 64 is shown with the target simulator 10 rotatably attached to it for driving by motor 16 described above in conjunction with FIG. 2. The sensing head 24 is mounted to the support structure 64, by two screws 71 and 72 which provide the mounting fixture for the sensing head 24. The mounting fixture for the printed circuit board 26, is provided by two or more stand-offs, 121 and 122, that are threaded to receive screws passing through the printed circuit board 26. In FIG. 6, the connecting wire 30 is not illustrated. The sensing head 24 can be manipulated relative to the support structure 64, by loosening screws 71 and 72, and then adjusting the gap D to a specified range for the sensing head 24 being tested and calibrated. The adjustment of the gap D is typically performed with shim stock of a prescribed thickness that is placed between the outer circumference of the target simulator 10 and the sensing head 24. When the prescribed gap D is set, screws 71 and 72 are tightened to fix the position of the sensing head 24 relative to the support structure 64. The printed circuit board 26 is then attached to the mounting fixture, represented by support stand-offs 121 and 122, and the electrical connector 30 is then attached between the sensing head 24 and printed circuit board 26.

Figure 7:
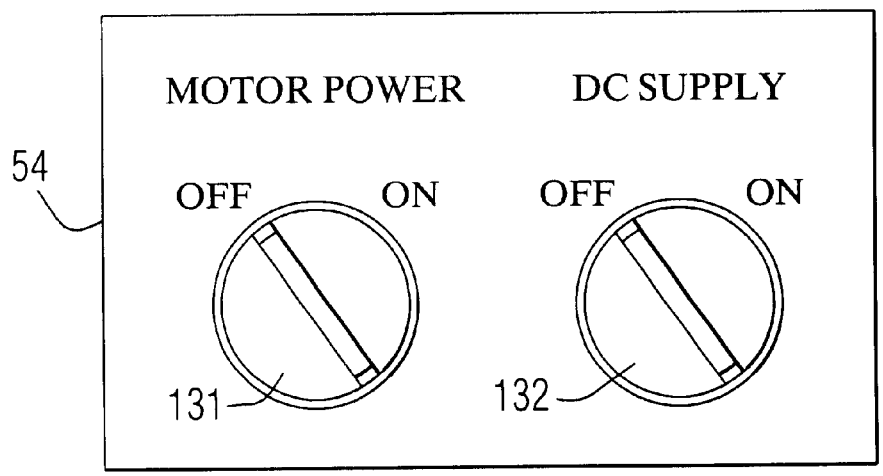
FIG. 7 is a front view of a control panel of the present invention.

The control box 54 described above in conjunction with FIG. 2 is shown in frontal view in FIG. 7. Two manually movable control switches, 131 and 132, are provided to allow the operator to connect the air supply 44 to the air motor 16 by actuating air valve 46. The other switch 132 allows the operator to connect the power supply 20 in electrical communication with the printed circuit board 26 of the sensor 22.

With reference to FIGS. 1–7, it can be seen that the present invention provides a portable testing and calibration apparatus for use with sensors, such as gear tooth sensors, that are commonly used in complex machine tools. By using the present invention, an operator can test and calibrate the sensor while the sensor is completely removed from the machine tool. This allows the sensor to be tested and calibrated completely prior to installation of the sensor within the machine tool. As a result, any defective or mis-calibrated sensors can be identified prior to the complex and expensive procedures of dismantling the machine tool, installing the sensor, and reconstructing the portions of the machine tool associated with the sensor. The present invention simulates the target that the sensor is designed to operate with and the simulation allows the operator to adjust the amplitude and offset of the signals provided by the printed circuit board of the sensor while the sensor is completely disconnected from the machine tool.

Although described with particular specificity and illustrated to show preferred embodiment of the present invention, it should be understood that alternative embodiments are also within its scope.

I claim:

1. Apparatus for testing a sensor, comprising:
   a target simulator;
   an air powered motor attached to said target simulator to cause said target simulator to move along a preselected path;
   a source of electric power connectable in electrical communication with said sensor;
   a signal receiver connectable in signal communication with said sensor, said signal receiver being configured to annunciate one or more preselected signals transmitted from said sensor to said signal receiver;
   a holding fixture located at a preselectable distance from said target simulator, said holding fixture being shaped to hold said sensor at a fixed distance from said target simulator when said motor causes said target simulator to move along said preselected path.

2. The apparatus of claim 1, wherein:
   said target simulator is a rotatable component.

3. The apparatus of claim 1, wherein:
   said target simulator comprises a plurality of discontinuities which are movable past said sensor.

4. The apparatus of claim 3, wherein:
   said plurality of discontinuities are a plurality of teeth formed in a surface of said target simulator.

5. The apparatus of claim 1, further comprising:
   a speed control device for selecting an operating speed of said motor.

6. The apparatus of claim 1, wherein:
   said sensor comprises a sensing head and an electronic circuit, said electronic circuit being connected in signal communication with said sensing head, said electronic circuit being connectable in signal communication with said signal receiver.

7. The apparatus of claim 6, wherein:
   said holding fixture comprises a first mounting fixture shaped to hold said sensing head and a second mounting fixture shaped to hold said electronic circuit.

8. The apparatus of claim 1, wherein:
   said signal receiver is an oscilloscope connectable in signal communication with said sensor, said signal receiver being configured to visually annunciate one or more preselected signals transmitted from said sensor to said signal receiver.

9. Apparatus for testing a sensor, comprising:
   a rotatable target simulator comprising a plurality of discontinuities which are movable past said sensor;
   an air powered motor attached to said target simulator to cause said target simulator to move along a preselected path;
   a source of electric power connectable in electrical communication with said sensor;
   a signal receiver connectable in signal communication with said sensor, said signal receiver being configured to annunciate one or more preselected signals transmitted from said sensor to said signal receiver;
   a holding fixture located at a preselectable distance from said target simulator, said holding fixture being shaped to hold said sensor at a fixed distance from said target simulator when said motor causes said target simulator to move along said preselected path.

10. The apparatus of claim 9, wherein:
    said plurality of discontinuities are a plurality of teeth formed in a surface of said target simulator.

11. The apparatus of claim 10, further comprising:
    a speed control device for selecting an operating speed of said motor.

12. The apparatus of claim 11, wherein:
    said sensor comprises a sensing head and an electronic circuit, said electronic circuit being connected in signal communication with said sensing head, said electronic circuit being connectable in signal communication with said signal receiver.

13. The apparatus of claim 12, wherein:
    said holding fixture comprises a first mounting fixture shaped to hold said sensing head and a second mounting fixture shaped to hold said electronic circuit.

14. The apparatus of claim 13, wherein:
    said signal receiver is an oscilloscope connectable in signal communication with said sensor, said signal receiver being configured to visually annunciate one or more preselected signals transmitted from said sensor to said signal receiver.

15. Apparatus for testing a sensor, comprising:
    a rotatable target simulator comprising a plurality of teeth which are movable past said sensor;
    an air powered motor attached to said target simulator to cause said target simulator to move along a preselected path;

a source of electric power connectable in electrical communication with said sensor;

a signal receiver connectable in signal communication with said sensor, said signal receiver being configured to annunciate one or more preselected signals transmitted from said sensor to said signal receiver;

a holding fixture located at a preselectable distance from said target simulator, said holding fixture being shaped to hold said sensor at a fixed distance from said target simulator when said motor causes said target simulator to move along said preselected path; and a speed control device for selecting an operating speed of said motor.

16. The apparatus of claim 15, wherein:

said sensor comprises a sensing head and an electronic circuit, said electronic circuit being connected in signal communication with said sensing head, said electronic circuit being connectable in signal communication with said signal receiver.

17. The apparatus of claim 16, wherein:

said holding fixture comprises a first mounting fixture shaped to hold said sensing head and a second mounting fixture shaped to hold said electronic circuit.

18. The apparatus of claim 17, wherein:

said signal receiver is an oscilloscope connectable in signal communication with said sensor, said signal receiver being configured to visually annunciate one or more preselected signals transmitted from said sensor to said signal receiver.

* * * * *